(12) United States Patent
Buchberger et al.

(10) Patent No.: US 8,800,750 B2
(45) Date of Patent: Aug. 12, 2014

(54) METHOD FOR TRANSFERRING ARTICLES IN A CONVEYOR SYSTEM

(75) Inventors: Peter Buchberger, Waltenhofen (DE); Wolfgang Buchenberg, Oy-Mittelberg (DE); Wolfgang Gross, Trunkelsberg (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 109 days.

(21) Appl. No.: 13/435,680

(22) Filed: Mar. 30, 2012

(65) Prior Publication Data

US 2012/0247926 A1    Oct. 4, 2012

(30) Foreign Application Priority Data

Apr. 1, 2011   (DE) .......................... 10 2011 015 766

(51) Int. Cl.
*B65G 47/31*   (2006.01)
*B65G 43/10*   (2006.01)

(52) U.S. Cl.
CPC ................ *B65G 43/10* (2013.01); *B65G 47/31* (2013.01)
USPC .................................... 198/461.1; 198/461.2

(58) Field of Classification Search
USPC ...................... 198/460.1, 461.1, 461.2, 461.3
See application file for complete search history.

(56) References Cited

U.S. PATENT DOCUMENTS

| | | | | |
|---|---|---|---|---|
| 3,827,545 A * | 8/1974 | Buhayar | ..................... | 198/461.2 |
| 5,634,551 A * | 6/1997 | Francioni et al. | ......... | 198/460.1 |
| 5,971,134 A | 10/1999 | Trefz et al. | | |
| 6,000,528 A * | 12/1999 | van Maanen | ............... | 198/461.1 |
| 6,041,912 A * | 3/2000 | Finkowski et al. | ........ | 198/461.2 |
| 6,170,639 B1 * | 1/2001 | Diederich | ................... | 198/461.2 |
| 6,227,349 B1 * | 5/2001 | Finkowski et al. | ........ | 198/461.1 |
| 6,629,018 B2 * | 9/2003 | Mondie et al. | ............. | 198/460.1 |
| 6,763,931 B1 | 7/2004 | Brehm | | |
| 8,360,229 B2 * | 1/2013 | Janning | ...................... | 198/459.1 |
| 2009/0114508 A1 | 5/2009 | Hara et al. | | |

FOREIGN PATENT DOCUMENTS

DE   196 25 470 A1   1/1998
EP      0816273 A1   1/1998

OTHER PUBLICATIONS

German Official Communication dated Feb. 24, 2012, Applicant MULTIVAC Sepp Haggenmueller & Co. KG, Application No. 10 2011 015 766.2, 6 Pages.

* cited by examiner

*Primary Examiner* — James R Bidwell

(74) *Attorney, Agent, or Firm* — Husch Blackwell LLP

(57) ABSTRACT

A method of transferring an article from a first drivable conveyor means to a second drivable conveyor means, the transfer of the article taking place during a synchronous phase in which the first and the second conveyor means have the same common speed as one another at any time. The method is characterized in that, during the synchronous phase, the common speed increases at least sectionwise and/or decreases at least sectionwise. A corresponding conveyor system operable for performing the method of transferring an article from a first drivable conveyor means to a second drivable conveyor means, as well as a packaging plant comprising such a conveyor system.

14 Claims, 5 Drawing Sheets

METHOD FOR TRANSFERRING ARTICLES IN A CONVEYOR SYSTEM

CROSS-REFERENCE TO RELATED APPLICATIONS

This application claims foreign priority benefits under 35 U.S.C. §119(a)-(d) to German patent application number DE 102011015766.2, filed Apr. 1, 2011, which is incorporated by reference in its entirety.

TECHNICAL FIELD

The present disclosure relates to a method of transferring an article in a conveyor system.

BACKGROUND

Methods and conveyor systems of this type are known in practice, e.g., in association with packaging machines and packaging plants. The use of such conveyor systems often necessitates the transfer of articles (in the case of packaging machines: e.g., packages) from an irregular mode of arrangement on a first conveyor means to a regular, equidistant mode of arrangement on a second conveyor means. Likewise, it may become necessary to transfer articles from a regular mode of arrangement with a first mutual distance on the first conveyor means to a regular mode of arrangement with a second, different mutual distance on the second conveyor means. In this way, the articles on the second conveyor means can be grouped, arranged and further transported at a predetermined distance from one another.

In this context it is important in many cases to avoid a relative movement between the two conveyor means during transfer of an article from the first to the second conveyor means, i.e., the two conveyor means have to move at the same speed during a so-called "synchronous phase". Otherwise, uncontrollable slip may occur or the articles may cant, and equidistant grouping would consequently be impossible. In addition, abrupt acceleration or abrupt deceleration might occur during transfer from one conveyor means to the other. This may, if the packages conveyed contain liquid products, e.g., lead to spilling over and thus to a contamination of the conveyor system.

FIG. 5 exemplarily shows the curve of a speed profile of a first and of a second conveyor means in a conventional conveyor system. The conveyed articles are here transferred from a first conveyor means to a second conveyor means. The speed profile of the first conveyor means is shown in the form of a solid line, and the speed profile of the second conveyor means is shown in the form of a broken line. The speed profiles of the two conveyor means recur periodically. A period or work cycle starts with a stationary phase in which both conveyor means are standing still. At the moment in time t1, the first conveyor means, which has to travel a longer distance than the second conveyor means until a synchronous phase begins, starts moving in an accelerated mode. This acceleration takes place until a maximum speed $v_{max}$ has been reached. At a later moment in time t2, also the second conveyor means starts moving. Precisely at the moment at which the second conveyor means reaches the maximum speed $v_{max}$, i.e., at the moment in time t3, the synchronous phase, in which the two conveyor means move at a constant and common speed $v_{max}$, begins. The synchronous phase is timed such that, during said synchronous phase, the articles (e.g., packages) are transferred from the first conveyor means to the second conveyor means.

At the moment in time t4, the synchronous phase ends. First, only the second conveyor means is decelerated, since the first conveyor means still has to travel another distance and therefore maintains its speed $v_{max}$ for the time being. Only after a certain period of time, also the first conveyor means is decelerated. At the moment in time t5, the second conveyor means comes to rest, and at a later moment in time t6 also the first conveyor means. The moment in time t6 thus functionally corresponds to the moment in time t0, i.e., a new cycle starts at the moment in time t6.

The speed profiles shown in FIG. 5 are determined by the boundary conditions that are predetermined by the two conveyor means. For example, the speed of the two conveyor means must not exceed a specific maximum speed, since the conveyor means are normally designed only for a certain maximum speed, or since the speed at which the articles are conveyed must not exceed a certain maximum speed. If the article in question is e.g., salad in a package, the salad, if conveyed at an excessively high speed, may be blown over the edge of the package. In addition, a specific acceleration or deceleration must not be exceeded, since otherwise the conveyor means, its drive, or the article conveyed by the conveyor means may have applied thereto excessive loads or the friction required between the conveyor means and the article for the purpose of transport may decrease excessively or a liquid content of the article may spill over. Moreover, the two conveyor means have to travel certain distances so that they will be able to transfer the articles at specific moments in time and group them on the second conveyor means at predetermined distances from one another. In the time-speed diagram according to FIG. 5 the distance to be travelled is obtained as an integral under the respective speed profile.

In the so-called "acceleration phase" between the moments in time t1 and t3, i.e., from the beginning of the acceleration of the first conveyor means to the beginning of the synchronous phase, the integral under the speed profile of the first conveyor means and thus the distance travelled by said first conveyor means is larger than the integral under the speed profile of the second conveyor means. The maximum acceleration of the two conveyor means determines how steep the maximum gradient of the speed profile curve can be. Starting from the respective distance to be travelled and the desired moment in time t3 at which the synchronous phase should begin, the starting points t1 and t2 for the acceleration of the respective conveyor means are obtained. The same considerations also apply analogously to the deceleration phase between the moments in time t4 and t6. Also in this case the first conveyor means has to travel a longer distance than the second conveyor means in the example shown. The integral under the speed profile of the first conveyor means must be correspondingly larger. This is accomplished in that the first conveyor means maintains, after the end of the synchronous phase at the moment in time t4, its maximum speed $v_{max}$ longer than the second conveyor means.

SUMMARY

It is an object of the present disclosure to provide a possibility of optimizing the process of transferring an article from a first conveyor means to a second conveyor means with respect to the shortest possible transfer times while simultaneously avoiding disadvantageous influences, such as extreme accelerations, on the article, said transfer process especially bringing the articles from a first, possibly irregular mode of arrangement of the articles on the first conveyor means to a predetermined, second mode of arrangement on the second conveyor means.

A method according to the present disclosure is so conceived that, during the synchronous phase, the common speed of the two conveyor means increases at least sectionwise (e.g., during one or more portions or sub-intervals of the synchronous phase), and said common speed also decreases at least sectionwise. The method thus overcomes the prejudice that the two conveyor means must necessarily be moved at a constant speed during the synchronous phase so that the articles can be transferred as evenly and as uniformly as possible to the second conveyor means. In contrast to the conventional method, the speed increase and/or decrease during the synchronous phase allow/allows a higher average speed of the two conveyor means during the synchronous phase than in the conventional method.

The acceleration and deceleration of the two conveyor means can be chosen, e.g., in dependence upon viscosity, friction and/or other characteristics of the articles to be conveyed, such that all negative acceleration effects on the articles are avoided. The average speed which is higher than the average speed in the prior art leads to a faster transfer of the articles, i.e., to a shorter transfer time. Hence, the throughput of the conveyor system operated by the method according to the present disclosure increases, i.e., the number of articles transferred per unit time increases, and this means an increase in the performance of the packaging machine.

Preferably, the period in which the common speed increases from a speed level at the beginning of the synchronous phase to a maximum speed reached during the synchronous phase is as long as the period in which the speed decreases from the speed maximum to a speed level at the end of the synchronous phase. In this way it can be guaranteed that the acceleration forces acting on the conveyor means and the articles during the acceleration period within the synchronous phase are not higher than those occurring during the deceleration period—and vice versa. This guarantees once more that no excessively high forces act on the articles.

According to an advantageous embodiment, the speed level at the end of the synchronous phase is different from the speed level at the beginning of the synchronous phase. In specific cases, it is thus possible to achieve a particularly short time for the transfer process. Normally, it will be advisable to determine the speed level at the end of the synchronous phase with due regard to the distance to be covered and the maximum delay of the conveyor means which, after the synchronous phase, has to cover a shorter distance than the other conveyor means.

However, it is often also possible to reduce the duration of the synchronous phase in that the amount to which the speed increases from a speed level at the beginning of the synchronous phase to a maximum speed is identical to the amount to which the speed decreases from the maximum speed to the speed level at the end of the synchronous phase. In other words, the synchronous phase will then begin and end on the same speed level.

A simple motion profile with minimized vibrations of the article in question is obtained when the common speed during the synchronous phase has precisely one phase in which the common speed increases (i.e., an acceleration period) and precisely one phase in which the common speed decreases.

In some cases, an admissible maximum speed of one or both conveyor means may, however, be exceeded in the case of such a motion profile. In order to prevent this, the maximum speed may also remain limited to a specific maximum value during the synchronous phase. In order to achieve nevertheless the shortest possible transfer time, the speed may first increase to the maximum speed during the synchronous phase, and this maximum speed may be maintained for a predetermined period until the common speed decreases again to the level at the end of the synchronous phase.

Substantial advantages are offered by a variant of the method according to the present disclosure which is so conceived that, prior to the synchronous phase, a conveyor means, e.g., the conveyor means that has to cover a longer distance than the other conveyor means prior to the transfer, is temporarily operated with an excess speed in comparison with the speed level at the beginning of the synchronous phase. Such an excess speed has not been suggested anywhere up to now. It is first contradictory to intuition, since it has the effect that the conveyor means operated with the excess speed must be decelerated after a first acceleration and must subsequently be re-accelerated together with the other conveyor means during the synchronous phase. The excess speed, however, has the enormous advantage that the duration of the acceleration phase from the beginning of the acceleration to the beginning of the synchronous phase can be reduced, since, due to the excess speed, a higher average speed can be achieved in the acceleration phase, without any admissible maximum speed or admissible maximum acceleration being exceeded. Together with the reduction of the transfer time according to the present disclosure and the synchronous phase, the excess speed also allows a reduction of the acceleration phase and thus a further reduction of the cycle times.

Analogous advantages with respect to a reduction of the cycle time are obtained when, after the end of the synchronous phase, a conveyor means, e.g., the conveyor means that has to cover a longer distance after the transfer, is temporarily operated with an excess speed in comparison with the speed level at the end of the synchronous phase.

A smooth, trouble-free transfer of the article is supported when the derivative of the speed profile of each conveyor means is continuous at any time, whereby abrupt changes of movement are avoided.

According to an advantageous embodiment, the acceleration of the conveyor means that has to cover a shorter distance than the other conveyor means prior to the transfer is reduced immediately prior to the synchronous phase. Normally, the acceleration can even be reduced to zero (at least for an instant) so that a certain speed is maintained at least for a moment or for a short period of time. The reduction of the acceleration of the conveyor means facilitates the adaptation of the speeds of the two conveyor means and thus the initiation of a common movement and speed during the synchronous phase.

Analogously to the above, the synchronous phase can more easily be exited when the negative acceleration of the conveyor means that has to cover a shorter distance than the other conveyor means after the synchronous phase increases gradually immediately after the synchronous phase.

It would also be advantageous if the amount of the acceleration of the two conveyor means were reduced, in extreme cases even reduced down to 0, prior to the end of the synchronous phase so that the two speed profiles can be separated more easily at the end of the synchronous phase.

According to a further aspect, the present disclosure relates to a conveyor system comprising a first conveyor means and a second conveyor means which are adapted to be driven independently of one another and which, for transferring an article, are adapted to be driven at a common, i.e., at the same speed as one another, during a synchronous phase. The present disclosure is so conceived that the conveyor system comprises a controller configured for increasing and/or decreasing, at least sectionwise, the common speed of the two conveyor means during the synchronous phase starting from a speed level at the beginning of the synchronous phase. If necessary, the common speed may also be reduced again, sectionwise, during the synchronous phase. As has been explained above, this results in an average speed during the synchronous phase which is higher than the average speed obtained in the case of a permanently constant speed, so that the duration of the synchronous phase and thus a transfer time can be reduced and a cycle performance increased.

The first and/or the second conveyor means are preferably an endless conveyor, e.g., a cleated chain grasping the articles or a conveyor belt.

The flexibility of use of the conveyor system according to the present disclosure can be increased when an admissible maximum speed or acceleration of the first conveyor means and/or of the second conveyor means can be adjusted by means of the controller. In particular, it would be imaginable that an operator predetermines such values for an admissible maximum speed or maximum acceleration in the controller, especially in dependence upon the articles to be conveyed. The shortest possible transfer time can thus always be accomplished in dependence upon the characteristics of the articles in question.

The conveyor system is particularly suitable for use in a packaging plant or in association with a packaging machine. The articles to be conveyed and to be transferred by means of the conveyor system are in this case packages.

In the following, an advantageous embodiment of the present disclosure will be explained in more detail making reference to a drawing.

DETAILED DESCRIPTION

Figure 1:
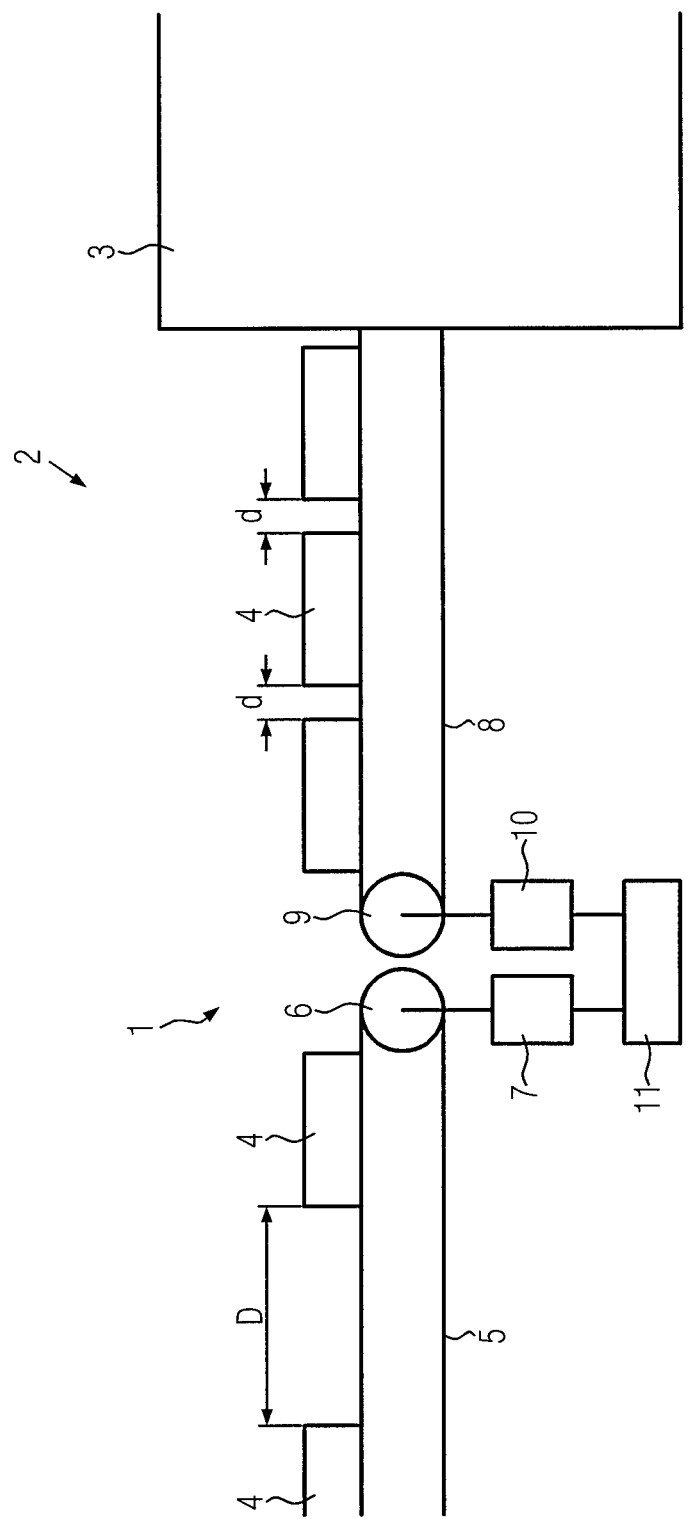
FIG. 1 is a strongly simplified representation of a conveyor system according to the present disclosure.

Identical components are provided with identical reference numerals throughout the figures.

FIG. 1 shows a conveyor system 1 according to the present disclosure constituting part of a packaging plant 2, which is also a plant according to the present disclosure and of which the first part of a packaging machine 3 is schematically shown, in addition to the conveyor system 1, said packaging machine 3 being e.g., a tray sealer. The packaging machine 3 processes (e.g., seals) articles 4, which may especially be packages 4. The articles 4 are first disposed in a possibly disordered condition on a first conveyor device or means 5 belonging to the conveyor system 1. This conveyor means 5 may, e.g., be a cleated chain or any other suitable conveyor by means of which the articles 4 are laterally held. Also in the embodiment shown, the first conveyor means 5 is an endless conveyor. It is, however, not a cleated chain but a conveyor belt. This endless conveyor belt 5 moves round a deflection pulley 6 which, in the embodiment shown, is configured as a drive roll. A first drive 7, e.g., an electric motor and in particular a servomotor, is used for driving the drive roll 6 and thus the first conveyor means 5.

The conveyor system 1 additionally comprises a second conveyor device or means 8, which, in the embodiment shown, is again an endless conveyor belt supplying the articles 4 to the packaging machine 3. As another example, the second conveyor means 8 may be any suitable conveyor, such as a cleated chain. The second conveyor means 8 is driven by a drive roll 9, which, in turn, is driven by means of a second drive 10. Also the second drive 10 is an electric motor and in particular a servomotor. The two drives 7, 10 are independent of one another so as to be able to move the two conveyor means 5, 8 independently of one another. Alternatively, a single, common drive could be provided, whose driving force is independently transmitted to the two conveyor means 5, 8 by means of a transmission. A controller 11, such as a programmable computer including a microprocessor and/or suitable circuitry, serves to control the two drives 7, 10 and to coordinate thus the movement of the two conveyor means 5, 8 of the conveyor system 1, respectively. This controller 11 can be provided separately for the conveyor system 1. It may, however, also be part of a control unit of the whole packaging plant 2. In particular, it is advisable to couple the controller 11 of the conveyor system 1 at least to the controller of the packaging machine 3, so that the operation of the conveyor system 1 can be adapted to an operation of the packaging machine 3, which is normally an intermittent type of operation.

The conveyor system 1 according to the present disclosure aims at transferring the articles 4 from the first conveyor means 5 to the second conveyor means 8 such that the articles 4 are grouped on the second conveyor means 8 with a different—in the present embodiment a smaller—distance d from one another than the distance D between two neighboring articles 4 on the first conveyor means 5 or at a regular distance d differing from an irregular distance on the first conveyor means 5.

Figure 2:
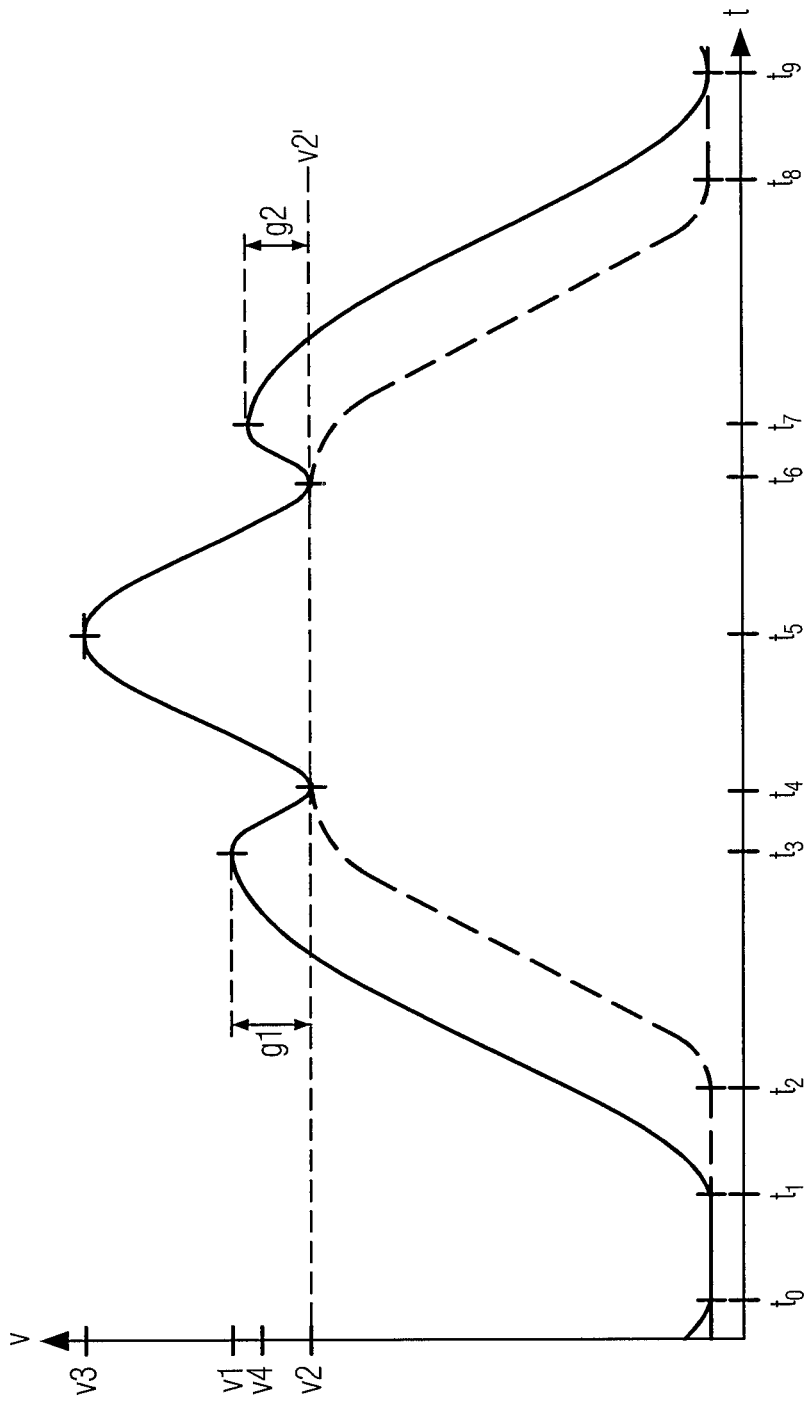
FIG. 2 is a first variant of the speed profiles of a first and second conveyor means in a method according to the present disclosure.

FIG. 2 exemplarily shows in a time-speed diagram the speed profiles of the first and second conveyor means 5, 8 according to one embodiment of the method according to the present disclosure. The time t is shown on the x-axis, and the speed v on the y-axis. The speed profile of the first conveyor means 5 is represented by a solid line, so is the speed profile of the common speed of the two conveyor means 5, 8 in the stationary phase and in the synchronous phase. In the intervals, in which the speed of the second conveyor means 8 deviates from the speed of the first conveyor means 5, the speed profile of the second conveyor means 8 is represented by broken lines.

At the moment in time t0, a cycle of the conveyor system 1 starts. The phase between the moments in time t0 and t1 is referred to as stationary phase, since the two conveyor means 5, 8 do not move during this stationary phase. Such a stationary phase may also be dispensed with, if it is not required for processing the articles, e.g., for filling the articles configured as packages.

As can be seen from FIG. 1, the intended distances d between the articles 4 on the second conveyor means 8 are smaller than the distances D between the articles 4 on the first conveyor means 5. Hence, the first conveyor means 5 has to travel a larger distance than the second conveyor means 8 before an article 4 is transferred, i.e. ,before the synchronous phase begins at the moment in time t4. In addition, the controller 11 has stored therein maximum admissible values for the speed and the acceleration of the first and second conveyor means 5, 8. With due regard to these boundary conditions, i.e., the distance to be covered by the first conveyor means 5, the maximum speed and the maximum acceleration of the first conveyor means 5, the controller 11 calculates a speed profile of the first conveyor means 5 for the so-called acceleration phase, which follows the stationary phase and precedes the synchronous phase. The resultant speed profile is shown in FIG. 2. The acceleration phase begins at the moment in time t1 with the acceleration of the first conveyor means 5. The second conveyor means 8 remains stationary until the moment in time t2; its movement only begins at the moment in time t2, since it has to cover a shorter distance than the first conveyor means 5.

At the moment in time t3, the first conveyor means 5 reaches its maximum speed v1 during the acceleration phase. This speed v1 is higher than the speed v2, which both conveyor means 5, 8 assume at the beginning of the synchronous phase at the moment in time t4. This means that, in comparison with the speed level v2 at the beginning of the synchronous phase, the first conveyor means 5 is operated with an excess speed g1 at the moment in time t3. Between the moments in time t3 and t4, the first conveyor means 5 is decelerated to the speed level v2. The excess speed g1 of the first conveyor means 5 has the advantage that the integral under the speed profile of the first conveyor means 5, which corresponds to the distance covered, is already reached after an acceleration phase (between the moments in time t1 and t4) which is shorter than the acceleration phase in the prior art, where the first conveyor means 5 reaches during the acceleration phase at most the speed level v2 that corresponds to the speed level at the beginning of the synchronous phase. Since the acceleration phase can be reduced, the whole cycle time of the conveyor system 1 can be reduced as well.

As has already been explained, the synchronous phase or synchronous movement of the two conveyor means 5, 8 begins at the moment in time t4. In order to guarantee that both conveyor means 5, 8 actually start with the same speed v2, the speed gradient, i.e., the acceleration of the second conveyor means 8, decreases immediately before the synchronous phase begins, e.g., in the period between the moments in time t3 and t4. The acceleration can be reduced down to 0. The speed profile of the first conveyor means 5, however, is of such a nature that the derivative of this speed profile, i.e., the acceleration of the first conveyor means 5, is constant at any time, especially also at the moment in time t4. A "break" in the speed profile and, consequently, an abrupt movement of the first conveyor means 5 at the moment in time t4 is avoided in this way.

The synchronous phase between the moments in time t4 and t6 is characterized in that the two conveyor means 5, 8 always travel with the same speed in this phase. First, this common speed increases between the moments in time t4 and t5 up to a maximum value v3 which, in the present embodiment, is even higher than the speed v1. Subsequently, the common speed decreases between the moments in time t5 and t6, starting from the maximum speed v3, to a speed level v2', which may be different from or identical with the speed level v2 at the beginning of the synchronous phase. In the present embodiment, the speed profile in the synchronous phase is symmetrical with respect to the moment in time t5, i.e., the acceleration period of the synchronous phase between the moments in time t4 and t5 is precisely as long as the deceleration period between the moments in time t5 and t6. The speed profile of the common speed during the synchronous phase is determined by the maximum admissible acceleration of the two conveyor means 5, 8 and the distance to be covered in the synchronous phase, these values being stored in the controller 11. Deviating from the representation in FIG. 2, it may be more advantageous when the speed level v2' at the end of the synchronous phase differs from the speed level v2 at the beginning of the synchronous phase.

At the moment in time t6, the synchronous phase ends and the deceleration phase begins. Starting from the speed level v2', the second conveyor means 8 is decelerated at the end of the synchronous phase until it reaches its position of rest at the moment in time t8. The first conveyor means 5, however, which again has to travel a longer distance than the second conveyor means 8, is, starting from the common speed level v2' at the end of the synchronous phase, accelerated again to a higher speed v4 between the moments in time t6 and t7. In other words, the first conveyor means 5 is, also during the deceleration phase, operated with an excess speed g2 in comparison with the common speed level v2' at the end of the synchronous phase. In the present example, this excess speed g2 of the first conveyor means 5 during the deceleration phase is, however, lower than the excess speed g1 during the acceleration phase. Alternatively, the excess speed g1 may also be lower than or identical to the excess speed g2. Starting from the speed v4 at the moment in time t7, the first conveyor means 5 is subsequently decelerated such that the deceleration characteristic of the first conveyor means 5 continues to remain constant, and that the maximum admissible negative acceleration of the first conveyor means 5 is achieved as long as possible. At the moment in time t9, also the first conveyor means 5 is again stationary. A new stationary phase of the two conveyor means and thus a new cycle begins. Therefore, the moment in time t9 corresponds functionally to the moment in time t0, and the speed profile shown in FIG. 2 recurs subsequently.

Figure 3:
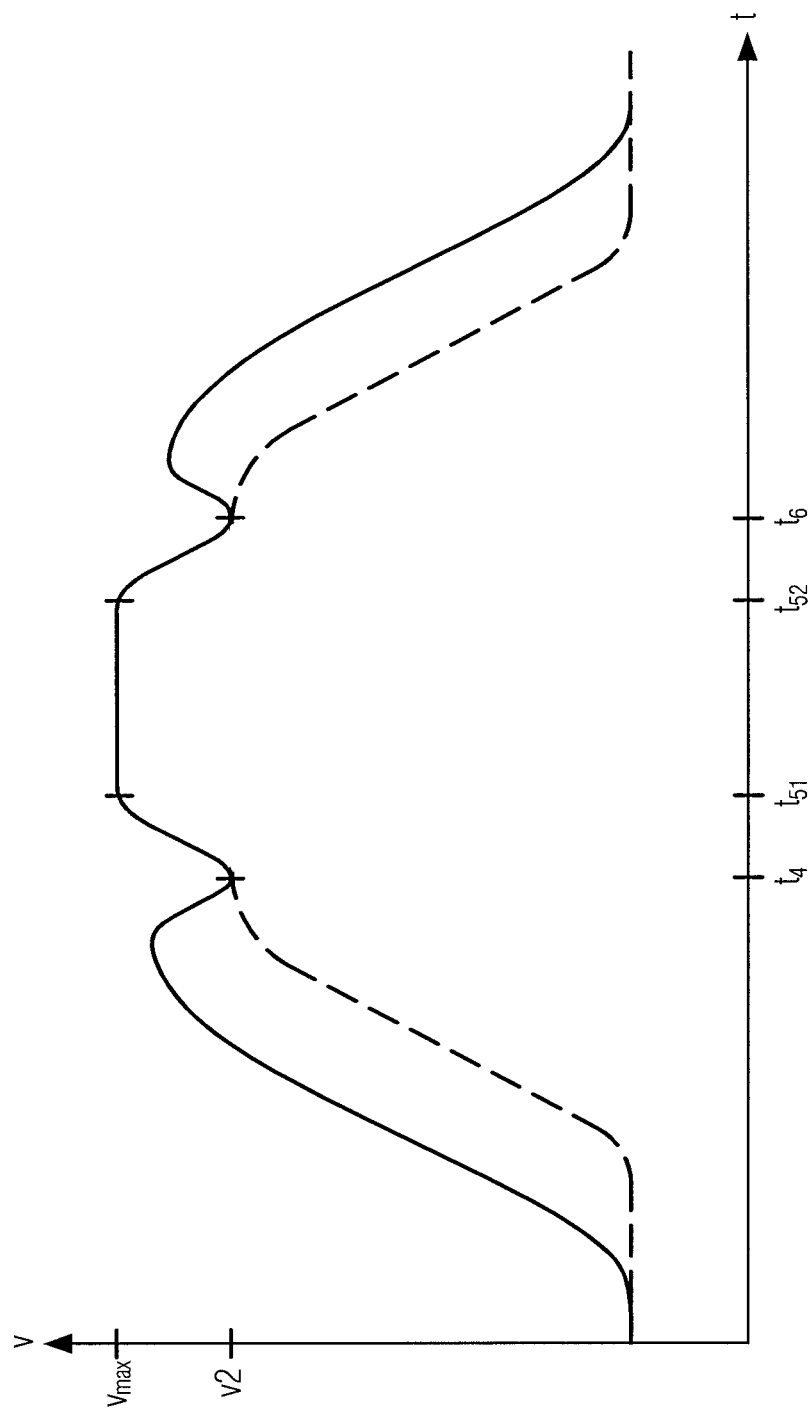
FIG. 3 is a second variant of the speed profiles.

FIG. 3 shows a further variant of the speed profiles of the two conveyor means 5, 8 in the method according to the present disclosure. In the case of this variant the two conveyor means 5, 8 would, during the synchronous phase, i.e., between the moments in time t4 and t6, reach, with the speed profile shown in FIG. 2, a speed above the maximum admissible speed $v_{max}$ of one or both conveyor means 5, 8. In order to avoid this, the common speed of the two conveyor means 5, 8 is, during the synchronous phase, first only accelerated in an acceleration period between the moments in time t4 and t51 to the maximum admissible speed $v_{max}$. This maximum speed $v_{max}$ is maintained as a constant speed up to the moment in time t52. Subsequently, the two conveyor means 5, 8 are decelerated in common between the moments in time t52 and t6. As for the rest, the speed profiles of the two conveyor means 5, 8 correspond to the speed profiles shown in FIG. 2. Just as in FIG. 2, also FIG. 3 shows the speed profile of the first conveyor means 5 and the common speed of both conveyor means 5, 8 in the form of a solid line, and the speed profile of the second conveyor means 8 deviating therefrom in the form of a broken line.

Figure 4:
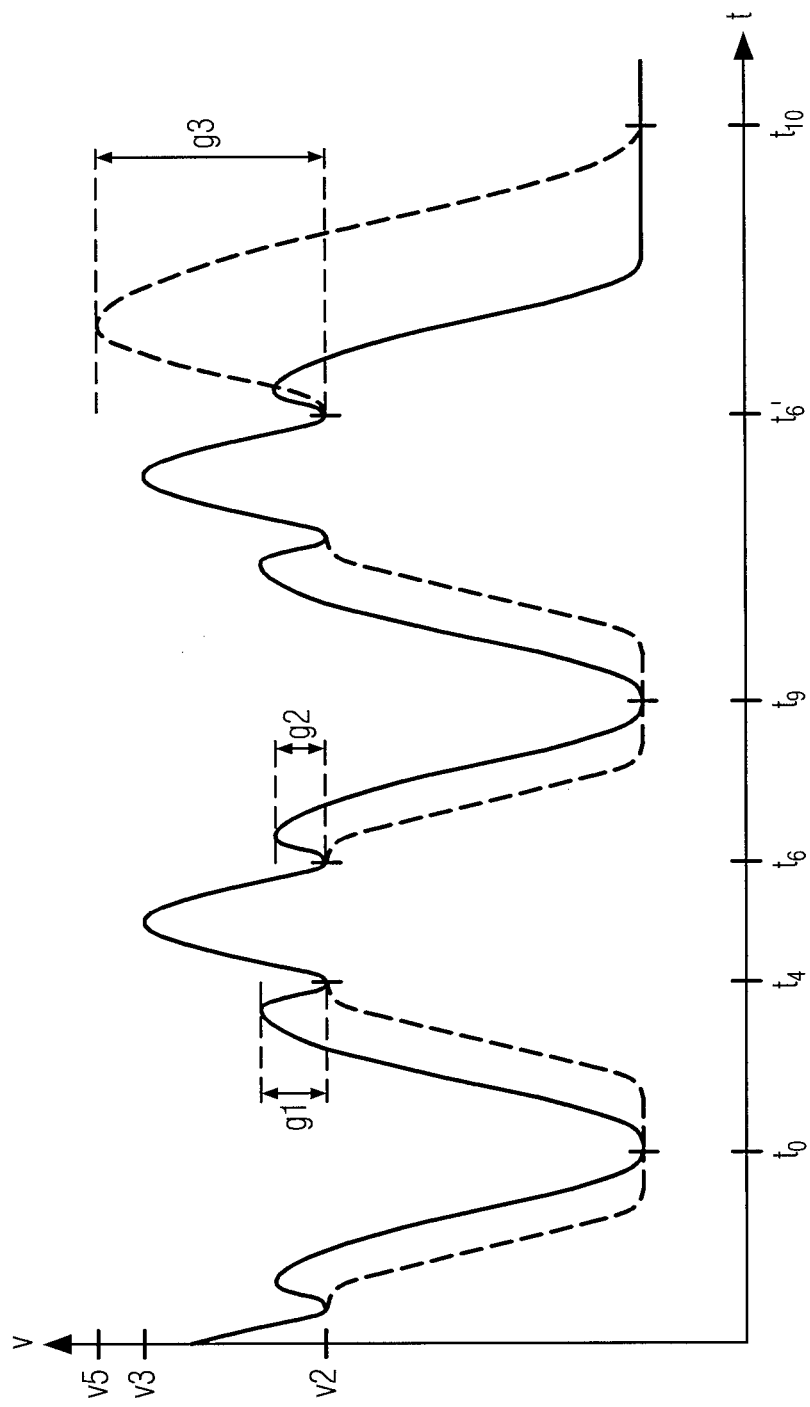
FIG. 4 is a third variant of the speed profiles.

FIG. 4 shows in a further time-speed diagram a special situation in the method according to the present disclosure. The speed profile of the first conveying means 5 as well as the common speed of the two conveyor means 5, 8 are again shown in the form of a solid line, and the speed profile of the second conveyor means 8 deviating therefrom is shown in the form of a broken line. Between the moments in time t0 and t9, the two conveyor means 5, 8 move with the speed profile that has already been specified and explained in detail with reference to FIG. 2. As has already been explained, the first conveyor means 5 is operated with an excess speed g1 before the synchronous phase begins. During the synchronous phase, the common speed of the two conveyor means 5, 8 first increases and then drops to the initial level v2' corresponding to the level at the beginning of the synchronous phase; this takes place between the moments in time t4 and t6. After the end of the synchronous phase at the moment in time t6, the first conveyor means 5 is again operated with an excess speed g2 in comparison with the common speed level v2' at the end of the synchronous phase.

At the moment in time t9, a new cycle of the conveyor system 1 begins. This new cycle differs from the operating cycle of FIG. 2 insofar as the end of the synchronous phase at the moment in time t6' is now followed by a so-called fetching phase. This fetching phase takes place when a group of articles 4 comprising a predetermined number of articles 4 has been compiled on the second conveyor 8. This group is then removed, i.e., fetched, in common. In the fetching phase, the first conveyor means 5 is operated with the same speed profile and with the same excess speed g2 as during the operating cycle shown in FIG. 2. The second conveyor means 8, however, now has to cover a much longer distance for removing the compiled group of articles 4. To this end, the second conveyor means 8 is, after the moment in time t6', operated with a much higher excess speed g3 than the first conveyor means 5. This excess speed g3 of the second conveyor means 8 is so high that the speed v5 reached by said second conveyor means 8 during the fetching phase may even be higher than the speed v3 during the synchronous phase. Starting from the speed v5, the second conveyor means is then decelerated until it is again stationary at the moment in time t10, whereupon a new cycle can begin. From FIG. 4 it can easily be seen that the integral under the speed profile of the second conveyor means 8 is very large during the fetching phase, i.e., between the moments in time t6' and t10. The distance covered by the second conveyor means 8 during this fetching phase is correspondingly large.

Deviating from the situation in FIG. 4, it may happen that, during the fetching phase, the excess speed g3 of the second conveyor means 8 would become so high that a maximum admissible speed of the second conveyor means 8 or of the articles 4 disposed thereon would be exceeded. In order to avoid this situation, the fetching phase may—similar to the situation shown in FIG. 3—comprise a phase in which the second conveyor means 8 maintains the maximum admissible speed $v_{max}$ as a constant speed so as to avoid an acceleration beyond the value $v_{max}$.

The boundary conditions stored in the controller 11, i.e., the distances d, D between the individual articles 4 which are predetermined or which are to be achieved, the maximum speed and the maximum acceleration of the two conveyor means 5, 8, can be changed by the operator. The movement of the conveyor system 1 can thus be adapted to varying situations and in particular to the characteristics of the articles 4 to be conveyed. For changing the boundary conditions and for inputting new boundary conditions an input device can be provided, which is coupled with the controller 11.

Figure 5:
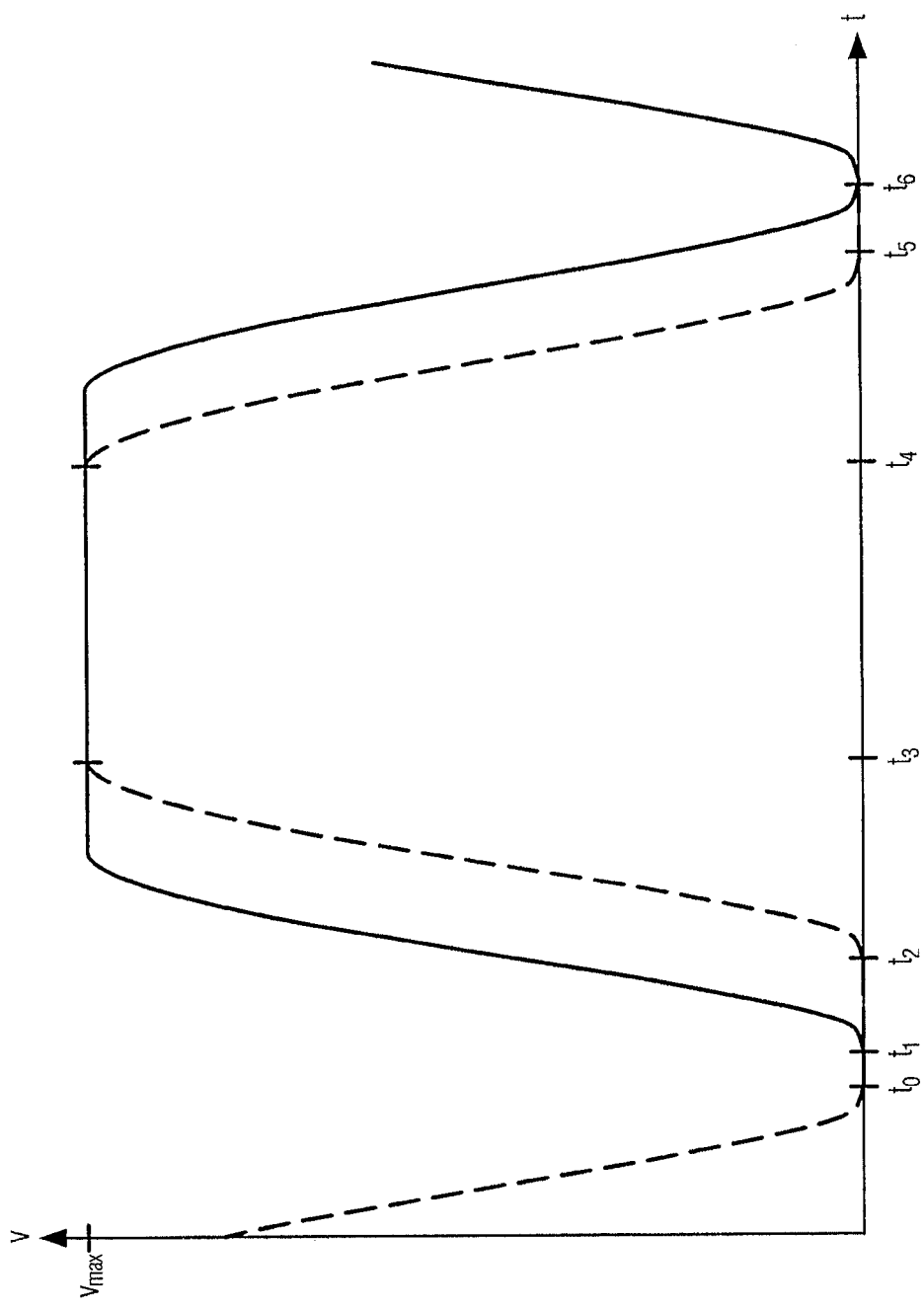
FIG. 5 is a speed profile of two conveyor means in a conventional conveyor system.

The method according to the present disclosure allows a much higher cycle performance (i.e., transfer of a higher number of articles per unit time) than conventional methods. For example, the conventional method of the type shown in FIG. 5 allows a transfer of 73 packages per minute, which means that (in the case of 5 packages per cycle) only 14.6 cycles can be achieved per minute. Other than this conventional method, the method according to the present disclosure allows a transfer of 82 packages per minute, i.e., 16.4 cycles per minute can be achieved. This corresponds to a 12% increase in cycle performance.

Starting from the above-described embodiment, the method according to the present disclosure and the conveyor system according to the present disclosure can be modified in many ways. For example, the excess speeds g1 and g2 may have the same value before and after the synchronous phase. In addition, not the first conveyor means 5, but the second conveyor means 8 may be operated before or after the synchronous phase with an excess speed, if the distances between the individual articles 4 are intended to be increased from the first conveyor means 5 to the second conveyor means 8. Accordingly, not the first conveyor means 5, but the second conveyor means 8 would be accelerated first in this case.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A method of transferring an article in a conveyor system of a packaging plant from a first drivable conveyor means to a second drivable conveyor means, the method comprising:
   operating the first and second conveyor means such that the conveyor means have a synchronous phase in which the conveyor means have a common speed at any time, wherein the common speed increases and/or decreases during at least a section of the synchronous phase; and
   transferring the article from the first conveyor means to the second conveyor means during the synchronous phase;
   wherein one of the conveyor means moves a shorter distance than the other conveyor means prior to the transferring step, and the method is performed such that acceleration of the one conveyor means is reduced to zero immediately prior to the synchronous phase.

2. A method according to claim 1 wherein the operating step is performed such that a speed level at an end of the synchronous phase is different from a speed level at a beginning of the synchronous phase.

3. A method according to claim 1 wherein the operating step is performed such that the common speed increases and decreases during the synchronous phase, and wherein the amount to which the common speed increases from a speed level at a beginning of the synchronous phase to a maximum speed is identical to the amount to which the common speed decreases from the maximum speed to a speed level at an end of the synchronous phase.

4. A method according to claim 1 wherein the operating step is performed such that the common speed during the synchronous phase has precisely one phase in which the common speed increases and precisely one phase in which the common speed decreases.

5. A method according to claim 1 wherein the operating step is performed such that the common speed increases to a maximum speed during the synchronous phase, the common speed is maintained at the maximum speed for a predetermined period, and the common speed decreases subsequently.

6. A method according to claim 1 further comprising, prior to the synchronous phase, temporarily operating one of the conveyor means with an excess speed in comparison with an speed level at a beginning of the synchronous phase.

7. A method according to claim 1 further comprising, after the synchronous phase, temporarily operating one of the conveyor means with an excess speed in comparison with a speed level at an end of the synchronous phase.

8. A method according to claim 7 wherein the step of temporarily operating one of the conveyor means is performed such that the excess speed is temporarily maintained as a constant speed.

9. A method according to claim 1 wherein each conveyor means has a speed profile, and, for each conveyor means, the derivative of the speed profile is continuous at any time.

10. A method according to claim 1 wherein one of the conveyor means moves a shorter distance than the other conveyor means after the synchronous phase, and the method further comprises increasing negative acceleration of the one conveyor means immediately after the synchronous phase.

11. A conveyor system comprising:
   a first conveyor device and a second conveyor device that are adapted to be driven independently of one another and that, for transferring an article between the conveyor devices, are adapted to be driven at a common speed during a synchronous phase; and
   a controller configured for increasing and/or decreasing the common speed of the two conveyor devices during one or more sections of the synchronous phase starting from a speed level at a beginning of the synchronous phase, wherein the controller is operable to move the first conveyor device a shorter distance than the second conveyor device prior to the transferring step, and the controller is operable to reduce the acceleration one of the first and second conveyor devices to zero immediately prior to the synchronous phase.

12. A conveyor system according to claim 11 wherein at least one of the conveyor devices is an endless conveyor.

13. A conveyor system according to claim 11 wherein the controller is operable to adjust an admissible maximum speed or acceleration of the first conveyor device and/or of the second conveyor device.

14. A packaging plant comprising a conveyor system according to claim 11, wherein the article to be transferred by the conveyor system is a package.

* * * * *